United States Patent
Madan et al.

(10) Patent No.: US 12,141,035 B2
(45) Date of Patent: Nov. 12, 2024

(54) SELF-HEALING RECOVERY OF FILES USING A CYBER RECOVERY VAULT FOR DEDUPLICATION FILE SYSTEMS

(71) Applicant: Dell Products L.P., Round Rock, TX (US)

(72) Inventors: Nitin Madan, Cupertino, CA (US); Bhimsen Bhanjois, Fremont, CA (US); Kalyan C. Gunda, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 144 days.

(21) Appl. No.: 17/839,192

(22) Filed: Jun. 13, 2022

(65) Prior Publication Data

US 2023/0401125 A1    Dec. 14, 2023

(51) Int. Cl.
*G06F 16/00* (2019.01)
*G06F 11/14* (2006.01)

(52) U.S. Cl.
CPC ...... *G06F 11/1453* (2013.01); *G06F 11/1458* (2013.01); *G06F 2201/84* (2013.01)

(58) Field of Classification Search
CPC ............. G06F 11/1453; G06F 11/1458; G06F 2201/84

USPC ......................................................... 707/649
See application file for complete search history.

(56) References Cited

U.S. PATENT DOCUMENTS

| | | | |
|---|---|---|---|
| 10,353,867 B1* | 7/2019 | Wong | G06F 16/162 |
| 10,810,162 B2* | 10/2020 | Wong | G06F 16/1748 |
| 11,392,458 B2* | 7/2022 | Chinthekindi | G06F 16/322 |
| 11,580,065 B1* | 2/2023 | Callewaert | G06F 3/067 |
| 2021/0406136 A1* | 12/2021 | Venkatesh | G06F 3/0665 |

\* cited by examiner

*Primary Examiner* — Monica M Pyo
(74) *Attorney, Agent, or Firm* — Staniford Tomita LLP (57) ABSTRACT

A self-healing method of recovering files using a cyber recovery vault for deduplication filesystems. Data to be backed up from a production system to a backup system in a datacenter is also copied to a cyber security vault coupled to the data center through an air gapped connection. A copy process makes a point-in-time (PIT) copy of the portion of data to a namespace in the vault, and retention locks the copied portion in the vault. An automated process detects a missing segment error, such as due to a bad index lookup in the data to be backed up. The self-healing process provides the missing segment from the PIT copy in the cyber security vault. For any missing fingerprints the process adds the data in new containers and the references in the index, providing an indirection that allows for just writing a new container with the missing L0 references and updating the index.

17 Claims, 8 Drawing Sheets

SELF-HEALING RECOVERY OF FILES USING A CYBER RECOVERY VAULT FOR DEDUPLICATION FILE SYSTEMS

TECHNICAL FIELD

Embodiments relate generally to deduplication storage systems, and more specifically to recovering files using a cyber recovery vault in deduplication filesystems.

BACKGROUND OF THE INVENTION

Data is typically backed up by copying the data from a data source to a data target or storage device or network (destination). Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead such as correcting corrupted data is increased through the backup and restore processes associated with deduplication.

The Data Domain File System (DDFS) from DellEMC is an example deduplication filesystem in which the filesystem anchors and segments data as it is ingested. The filesystem keeps track of segments which are stored on the disk, and if the segments are accessed again, the filesystem just stores a reference to the original data segment that was written to disk. A file is therefore a stream of segments, and these segments are uniquely identified by a key/label data element, called a fingerprint. Given a file offset and length, the corresponding data segment fingerprints need to be looked up to access the actual data.

In a data protection system, Purpose Build Backup Appliances (PBBAs) are often used as the storage of last resort. The Powerprotect Data Domain system by DellEMC is an example of one such PBBA and hosts the Data Domain File System (DDFS), which is designed to protect data from corruption. While the inherent data invulnerability architecture is efficient in detecting and recovering from many instances of corruption (in-memory, and on-disk), it also has its limitations. For example, RAID disk configurations comprise many individual disks (e.g., 15 disks in a RAID6 configuration), and if there more than two disk failures at one time, the filesystem is virtually helpless. Though such occurrences are rare, they certainly are possible, and such a failure can show up as a missing segment in one or more files, which can cause serious data loss.

What is needed, therefore, is a self-healing method to recover from a missing segment errors using a cyber recovery vault.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, and Data Domain Restorer are trademarks of Dell EMC Corporation.

BRIEF DESCRIPTION OF THE DRAWINGS

In the following drawings, like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software and systems deployed in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 1:
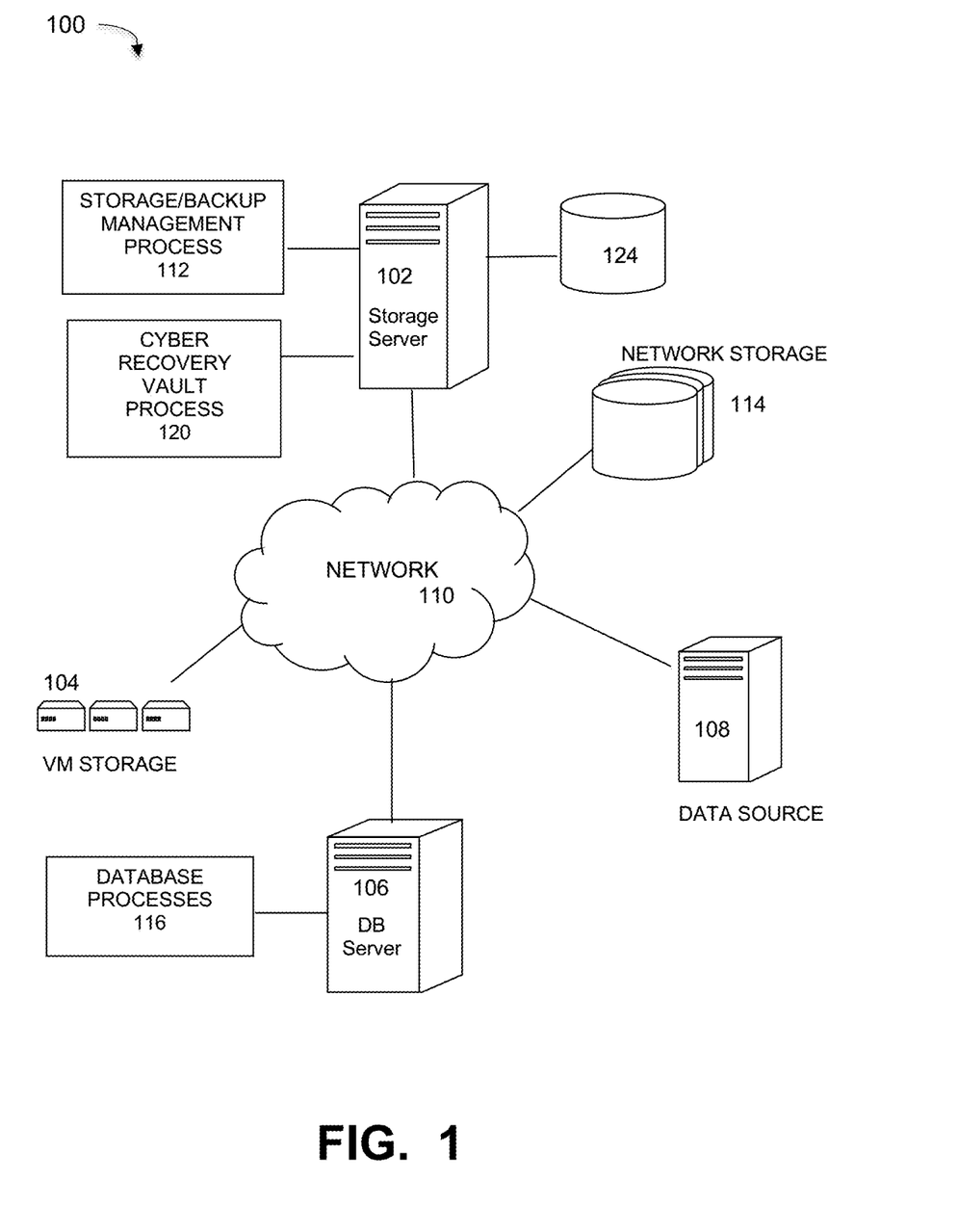
FIG. 1 is a diagram of a computing network implementing a self-healing method to recover from a missing segment errors using the cyber recovery vault, under some embodiments.

Embodiments are described for a self-healing method to recover from a missing segment errors using a cyber recovery vault. FIG. 1 illustrates a computer network system that implements one or more embodiments of a data processing and storage network system implementing such a process, under some embodiments.

In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

In general, Data Domain is a purpose-built backup appliance (PBBA) providing streaming deduplication that is able to ingest data at full network speeds, from multiple backup sources while providing storage efficiency. Present Data Domain systems are able to use tiered data storage technologies, such as very large multi-terabyte SATA drive trays, or SSD-enabled fast ingest trays.

The Data Domain File System (DDFS) is an inline data deduplication filesystem. As data gets written to the filesystem, DDFS breaks it into variable sized segments and a group of segments are packed in a compression region. A number of compression regions are grouped together and written as a container to disk. DDFS calculates fingerprint signatures for each segment using SHA1 algorithm. DDFS has an on-disk fingerprint index table, which maps the fingerprint to the container-ID, that has the corresponding segment data. The container has a metadata section followed by several data sections. The data sections store the compression regions; and the container metadata section stores the meta information of the container, i.e., it stores the total number of compression regions, the total number of segments, the fingerprint of each segment, and so on.

In a deduplicated file-system that forms segments from data, these segments are uniquely identified by their key/label called as fingerprint. Given a file offset and length, the corresponding data segment fingerprints need to be looked up. To provide faster offset to fingerprint lookup the mapping is stored in a Merkle tree format where the leaf nodes represent data segments and their fingerprints are stored in the parent nodes which are metadata segments. In a Merkle tree, every non-leaf node is labeled with the hash of the labels of its children nodes to allow efficient and secure verification of the contents of large data structures.

A file in DDFS is represented by a Merkle tree with user data as variable sized segments at the bottom level of the tree, referred to as L0 segments. The SHA1 fingerprints of those segments are grouped together at the next higher level of the tree to form new segments, referred to as L1 segments. SHA1 fingerprints of L1 segments are grouped together as L2 segments, and this continues up to L6 which represents the entire file. The top segment of the tree is always an L6 segment, even though it may refer to any lower numbered segments. Segments above L0 are referred to as Lp chunks. The L6 segment of every file is stored in a namespace which is represented as a B+ Tree. The L0 and Lp segments are written to separate containers, known as L0 and Lp containers.

Figure 2:
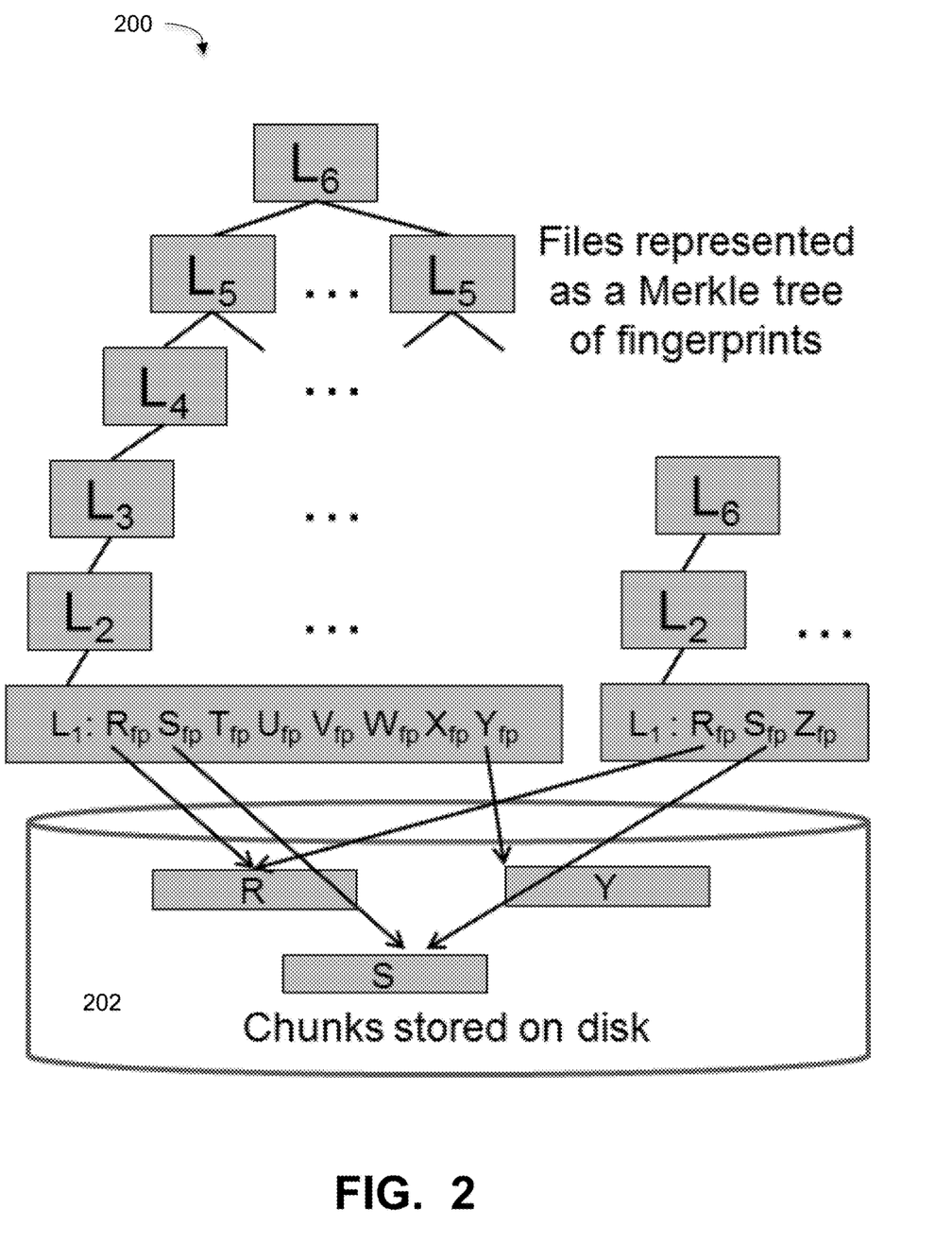
FIG. 2 illustrates files an example Merkle tree representation of files in a deduplication backup system, under some embodiments.

FIG. 2 illustrates files an example Merkle tree representation of files in a deduplication backup system, under some embodiments. As shown in FIG. 2, Merkle tree 200 comprises layers L0 to L6. The chunks directly written to disk 202 are referred to as $L_0$, meaning the lowest level of the tree. Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough not to need intermediate nodes such as the example on the right side of the figure. The $L_1$-$L_6$ chunks are referred to as $L_p$ chunks, where p is a parameter that ranges from 1 to 6 and indicates metadata representing the file. Deduplication takes place because a chunk can be referenced multiple times. The file system is a forest of Merkle trees, but these trees are not disjoint, particularly at the lowest level. In general, $L_p$ chunks are themselves stored on disk in containers, which include a relatively small (hundreds of KB) metadata section with a list of fingerprints for the chunks within the container. Thus, they may be read more quickly than the full container.

A Data Domain or similar system can efficiently copy an existing file using the same underlying Merkle tree. It creates the new file with a new name, and therefore a new $L_6$ root of the tree, but that tree then references the identical $L_P$ chunks. As this operation involves only the root of the tree, it is trivially fast and does not increase physical space in use beyond the one chunk containing the $L_6$.

Figure 3:
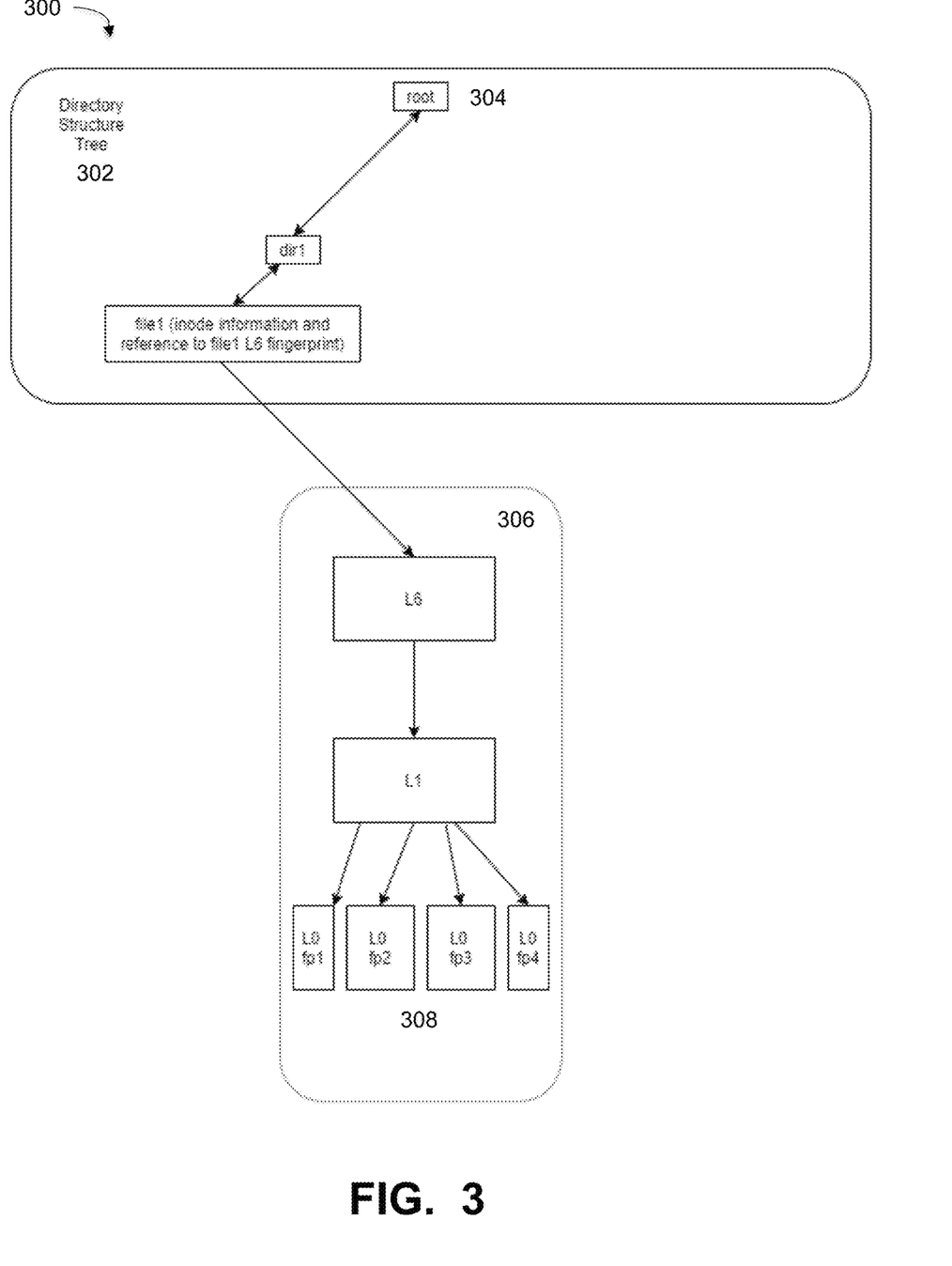
FIG. 3 illustrates a Data Domain filesystem Merkle tree accessed by a file under an example embodiment.

FIG. 3 illustrates a DDFS Merkle tree accessed by a file under an example embodiment. As shown in system 300, a directory structure tree 302 comprises a root directory 304, which accesses a directory (dir1) that holds a particular file (file1). The directory tree data for file1 comprises inode information and a reference to the file1 L6 fingerprint in the associated Merkle tree 306.

As mentioned above, the data chunks directly written to disk are referred to as $L_0$, meaning the lowest level of the tree, and which hold the respective fingerprints (fp1 to fpn). Consecutive $L_0$ chunks are referenced with an array of fingerprints by an $L_1$ chunk, which itself is identified by a fingerprint. An array of $L_1$ fingerprints is referenced by an $L_2$ chunk, continuing to the root of the tree; the root is always labeled $L_6$ for convenience, even if the file is small enough to not need intermediate nodes. The $L_1$-$L_6$ chunks are referred to as $L_p$ chunks, where p is a parameter that ranges from 1 to 6 and indicates metadata representing the file. Deduplication takes place because a chunk can be referenced multiple times. The filesystem is a forest of Merkle trees, but these trees are not disjoint, particularly at the lowest level.

Figure 4:
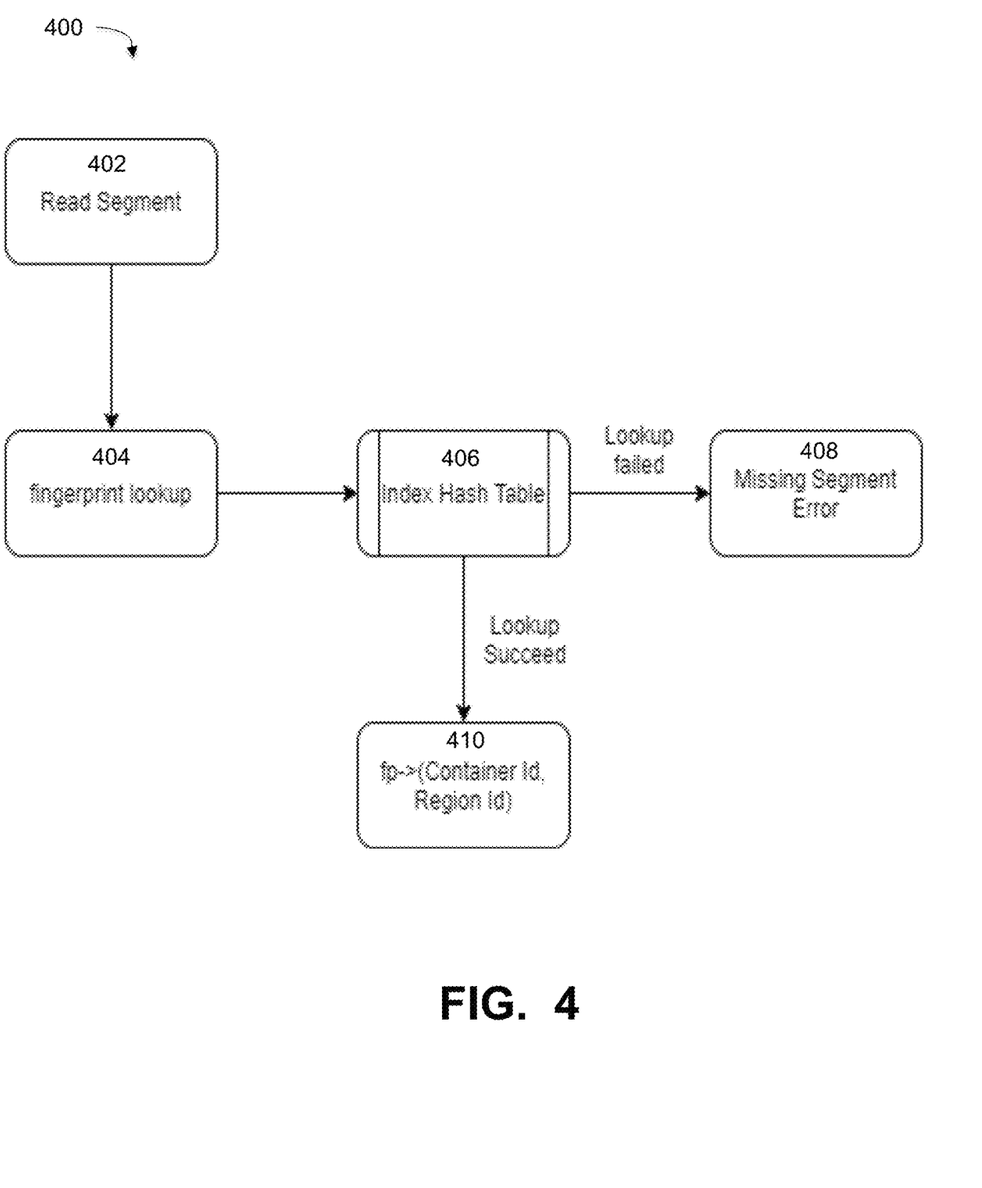
FIG. 4 illustrates a data read from a Merkle tree, under some embodiments.

It should be noted that the L1 segment holds the fingerprints (or references) to the L0 segments (which have the actual data). The process to read a particular segment involves lookup of the fingerprint using the index hash table. FIG. 4 illustrates a data read from a Merkle tree, under some embodiments. In process 400, a read segment 402 performs a fingerprint lookup 404, which comprises an index lookup to the index hash table 406. The index lookup returns the container ID and region ID 410 for the fingerprint, so that the read process can seek to the right location on the disk if the lookup is successful. However, if the lookup fails, this results in a missing segment error, 408, which can happen due to several reasons, such as if the container corresponding to the fingerprint has been deleted.

Figure 5A:
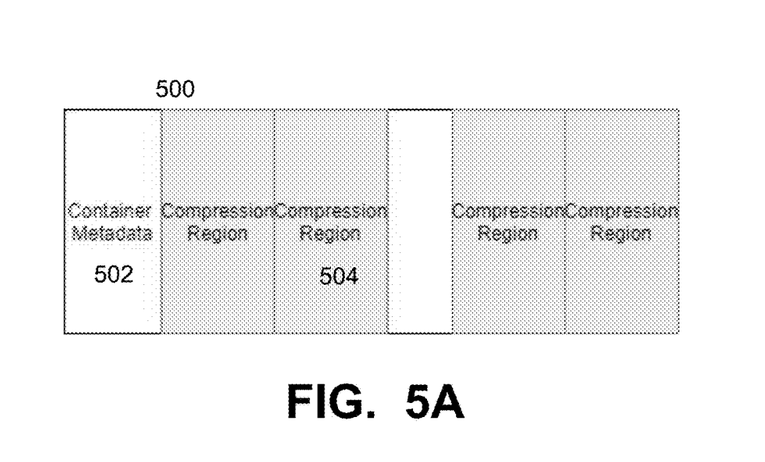
FIG. 5A illustrates a container comprising container metadata and a number of compression regions.
Figure 5B:
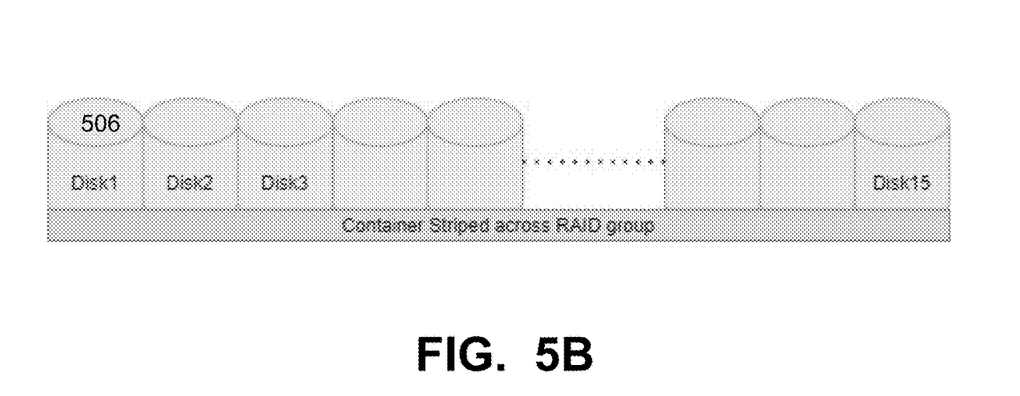
FIG. 5B illustrates a container striped across a RAID storage group.
Figure 5C:
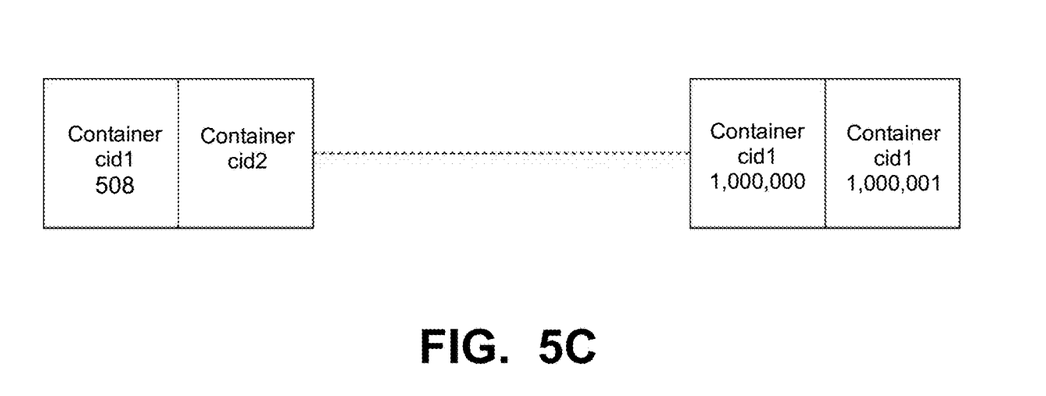
FIG. 5C illustrates an example container set comprising a large number of container IDs.

Data segments are stored in containers, and the containers by themselves are formed by compression regions. FIG. 5A illustrates a container 500 comprising container metadata 502 and a number of compression regions 504. The container is then striped across the RAID group (there is no read-modify write on the RAID stripe) as shown in FIG. 5B, wherein a number of disks 506 denoted Disk1 to Disk15 are store different container stripes. The containers are immutable and once written, a RAID stripe is never re-written for the same container. The containers are indexed by the container id, and this is called a container set (or cset). FIG. 5C illustrates an example container set comprising a large number of (e.g., one million) container IDs 508 denoted cid1 to cid1,000,001.

In general, a PBBA-based data protection system provides multiple layers of protection built into the system. This allows for detection of corruptions, and recovery. However, certain conditions may arise in which an error, such as a missing segment error that cannot be fixed by normal self-healing techniques. For example, if there are more than two disk failures in a RAID group, then there may be a lot of containers that are incomplete. Likewise, other situations, such as where filesystem bugs have inadvertently deleted some containers, may cause missing segments in the files referencing to the data in those files.

In general, RAID6, and similar systems, do not self-heal by themselves. However, embodiments of system 100 provide mechanisms that configure a RAID system to heal itself in case of a disk failure, or other similar issues. The DD-RAID implementation with additional verification methods allows for the RAID subsystem to correct errors. Process 120 implements a read-verify process instead of just a simple read operation, which allows for the correction to take place.

Figure 6:
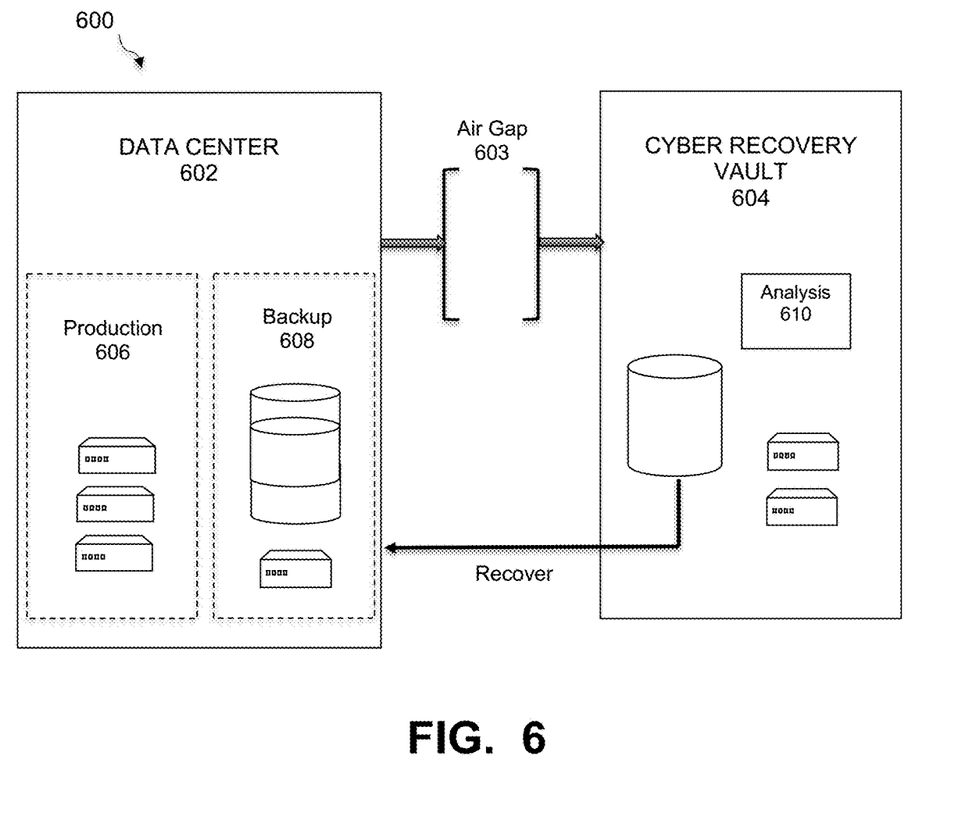
FIG. 6 illustrates the cyber recovery vault for a self-healing process for backup appliances, under some embodiments.

In an embodiment, process 120 provides a self-healing method to recover from a missing segment errors using a cyber recovery vault. FIG. 6 illustrates the cyber recovery vault for a self-healing process for backup appliances, under some embodiments. This vault helps implement the read-verify process for the data protection system.

In general, a cyber recovery vault, such as the DellEMC PowerProtect Cyber Recovery vault provides a data storage site is an isolated storage medium that provides multiple layers of protection to provide resilience against cyberattacks even from an insider threat. It moves critical data away from the attack surface, physically isolating it within a protected part of the data center and requires separate security credentials and multi-factor authentication for access. Additional safeguards include an automated operational air gap to provide network isolation and eliminate management interfaces which could be compromised. PowerProtect recovery tools automate the synchronization of data between production systems and the vault creating immutable copies with locked retention policies. If a cyber-attack occurs users can quickly identify a clean copy of data and recover critical systems to resume normal operations. When a production environment is ready for recovery, certain management tools automate the creation of the restore points that are used for recovery or security analytics, as well as performing damage assessments and forensics to provide an organization with the confident and most reliable path to recovery of business-critical systems.

As shown in FIG. 6, system 600 contains a data center 602 having a production site 606 and a backup site 608. The production site 606 contains servers that generate and process data, and the backup site 608 contains storage media and backup servers that store the data through backup and DR (disaster recovery) processes.

For the embodiment of FIG. 6, a cyber recovery vault 604 is used to replicate backed up data. The cyber recovery vault 604 is coupled to the data center over an air gapped connection 603, and the air-gap is controlled by from within the vault.

Figure 7:
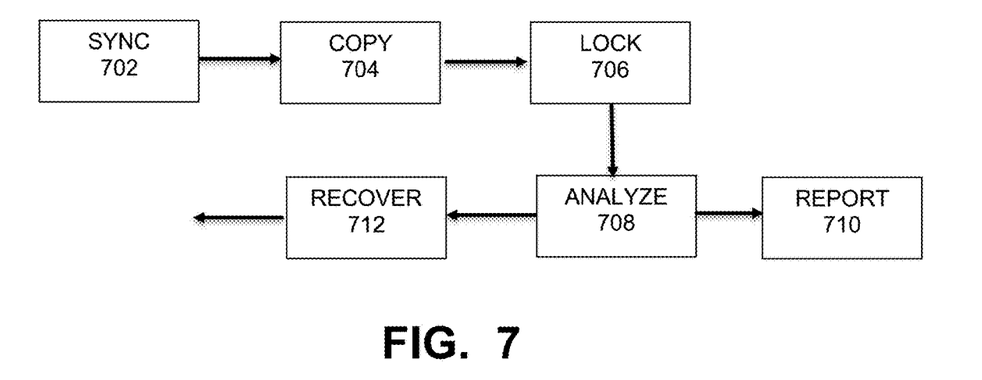
FIG. 7 is a block diagram illustrating some main functional processes of the cyber recovery vault system, under some embodiments.

FIG. 7 is a block diagram illustrating some main functional processes of the cyber recovery vault system 600, under some embodiments. The overall data processing process starts from the production system 606 as it is backed up to a namespace in the backup environment 608. A subset of the backup environment is then replicated, through a Sync operation 702, over to the vault 604, which becomes another backup environment, but one that is air-gapped.

Once the data lands in the vault namespace, a Point-in-Time (PIT) copy 704 of the namespace is copied over to another namespace, and is then retention locked 706. At this stage, the infrastructure guarantees immutability of the data stream.

As a final stage, this locked copy of the data is run through an optional analysis routine 708, such as provided by an analysis component 610 in vault 604. This analysis process scans the data for corrupted code, malware (e.g., ransomware), and so on. If any malware is detected, it is reported to the appropriate personnel, 710. The vault backed up data can then be recovered 712, through any needed recovery process.

The redundant cyber recovery vault backup environment provides a secure system by providing a setup in which the user is secure from attack vectors when the primary backups 608 are destroyed, as the vault 604 is inaccessible due to the air-gap 603.

The cyber recovery vault or appliance 604 holds the last few copies of the production files in its namespace. In an embodiment, the cyber recovery vault 604 can be used to lookup any missing fingerprints, thus allowing the system 600 to heal itself.

As stated earlier, a file is nothing but a collection of segment references. In a deduplication filesystem, these references could be pointing to segments all over the container set. Embodiments of the cyber recovery vault include an application program interface (API) that can obtain the missing segments from the cyber recovery vault 604. These segments can then be fixed into the backup filesystem 608. Furthermore, this process can be automated, to make this into a true self-healing system.

To illustrate the use of a cyber recovery vault in a self-healing process, a simple example is provided. It should be noted that while the following example is simple, it can certainly be extended to any case where upwards of millions of fingerprints may be missing.

For the example, assume that there is a container holding L0 segments that has been destroyed. This container is referred to as Container_ID_X. The filesystem has detected this corruption by its file verification technology. Assume for this example, that there is just one file that was corrupted, that is, a part of this file has L0 references (i.e., the fingerprint hash for the data in the L0 segment) that do not have the L0 data. At this stage, the L0 references can be looked up in the cyber recovery vault, and if the segments are present in the vault, they can be copied back into a new container. The indirection built into the system allows for just writing a new container with the missing L0 references and updating the index. The rest of the file system stack would take care of itself. A file in DDFS is nothing but a list of segments, and the segments hashes (fingerprints) are organized in a tree. In an embodiment, for any missing fingerprints, process 120 adds the data in new containers and the references in the index. When the file is read, the fingerprints will be looked up in the index, which will point to the newly written container. This provides the above-mentioned indirection mechanism. This technique also works if part of the container is corrupted. The sane segments would be copied out to a new container, and the old container is marked as deleted.

This example can be extended to any Lp segment container too. For example, if it were L1 segments that were written in that container, the L2 container which was holding the L1 references can be used, as in the example above.

The advantages of using the cyber recovery vault for this kind of use-case are at least two-fold. First, in most deployments, the cyber recovery vault is local to the primary data center, but only in an air gap. So, it is possible to leverage the network efficiencies. The replication protocol deduplicates across the network. The vault and the production system are usually in the same data center, and the vault is behind an air-gap. For this system, the network efficiency with the replication protocol will apply.

Second, the cyber recovery vault is retention locked, thus storing only the most recent point in time copies of the backups. The cyber recovery vault holds the most recent copies of the backup as point in time copies. These copies, internally are just a list of segments. If a file on the production system has a missing segment, it is very likely, that one of the PIT copies also references that segment in the vault. Therefore, it is very likely to have the fingerprints that were missing.

While entire files can be recovered from the vault, embodiments of process 120 also provide an ability to repair damaged files on the source by only extracting the missing or corrupted segments from the vault more efficiently.

Figure 8:
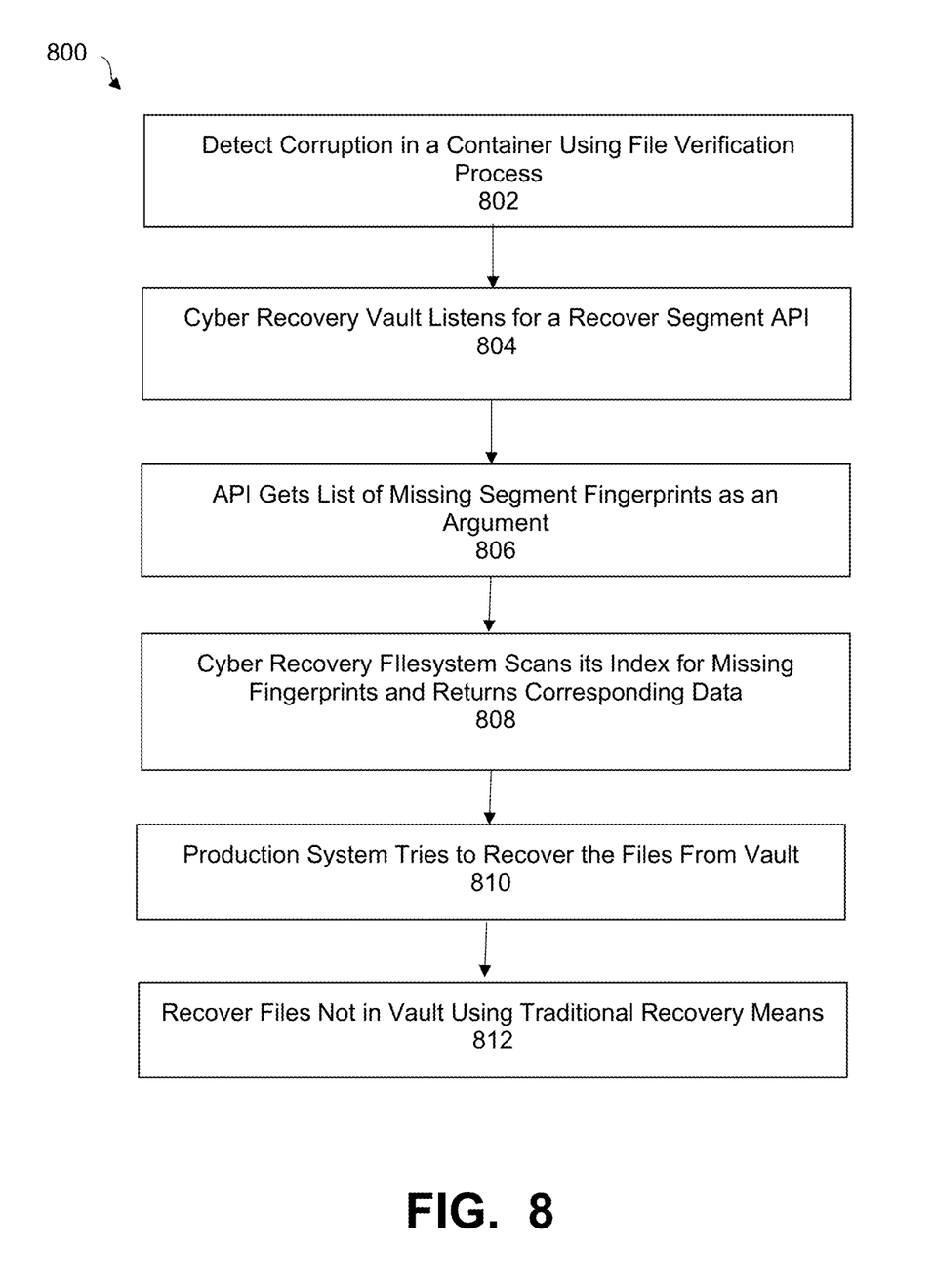
FIG. 8 is a flowchart illustrating a method of using a cyber recovery vault for self-healing deduplication filesystems, under some embodiments.

In an embodiment, such a system can be automated to provide a self-healing recovery system using the cyber recovery vault. FIG. 8 is a flowchart illustrating a method of using a cyber recovery vault for self-healing deduplication filesystems, under some embodiments. Process 800 starts with the filesystem discovering data corruption in at least one container using a file verification process 802. The cyber recovery vault listens for a recover segment API. This API would get, as an argument, a list of segment fingerprints which are missing, 806. The cyber recovery filesystem would then scan its index for these fingerprints and return the data which is available for those fingerprints, 808. The response to this API would also contain the fingerprints which could not be found. As an embodiment, the signature for such an API could be as below:

dd_err_t*dd_recover_refs(ref_t**ref_array,
    dd_buf_t*buffer)

The backup system at the production site requesting the cyber recovery vault would then try and recover the files from the cyber recovery vault, 810. If some files were not recovered from the vault, those will be called out in filesystem alerts, and traditional recovery methods will be used.

With respect to the recovery operation, since the cyber recovery vault uses an air gap, this API will only be available to the backup system at the production site when the air gap is closed. As this is not always ideal, embodiments make this API available only when the cyber recovery vault is put in a recovery mode. In this mode, the cyber recovery vault will allow connections from a certain host just for this API. All other connections will be disallowed. The traffic for this API will be encrypted and the host authentication will be done using transport layer security (TLS). This recovery mode may be enabled by the administrator (manual mode), or some special REST APIs (automation) from the backup system to the cyber recovery vault. The cyber recovery vault's airgap can be implemented via physical de-coupling of the network interfaces, or by using firewalls. If firewalls are used, certain ports can remain open. Embodiments include a special port that is configured to just listen for this one API, and which is secured by the TLS protocol. In other words, it will allow this one API to be called from outside the vault, even when the air gap is open for all other traffic. This API will be authenticated via secure protocols.

Another way to achieve this would be to build a manifest of missing segments and bring those into the affected system. By building the manifest the air gap is open only for a limited amount of time.

Embodiments thus described provide a self-healing method of recovering files using a cyber recovery vault for deduplication filesystems, and a secure recovery method which will work even when the cyber recovery vault is not open to traffic.

Embodiments of the processes and techniques described above can be implemented on any appropriate backup system operating environment or filesystem, or network server system. Such embodiments may include other or alternative data structures or definitions as needed or appropriate.

Figure 9:
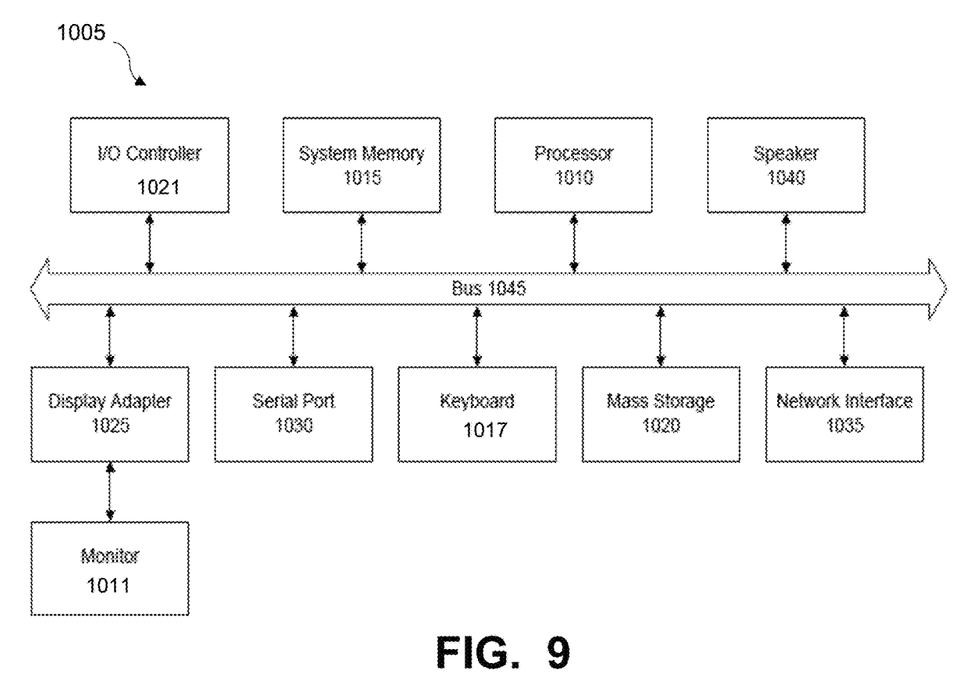
FIG. 9 is a system block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 9 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated "with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word:

any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method comprising:
copying data to be backed up from a production system to a backup system in data center; providing a cyber security vault coupled to the data center;
configuring an air-gapped connection between the data center and the cyber security vault to be controlled from within the cyber security vault and that renders the cyber security vault inaccessible without control of the air-gapped connection;
copying at least a portion of the data to be backed up to a first namespace in cyber security vault;
making a point-in-time (PIT) copy of the portion of data to a second namespace;
retention locking the copied portion of data in the second namespace;
detecting a corrupted data element in the data to be backed up; and
providing, through the vault controlled air-gapped connection, a missing data element for the corrupted data element from the PIT copy in the cyber security vault, wherein the data center comprises part of a deduplication backup process executed by a data storage server running a Data Domain File System (DDFS), and wherein the data to be backed up comprises compressed data stored in a container striped across of a plurality of disks in a disk array of the backup system, and wherein the air-gapped connection is automated to provide network isolation and eliminate potential compromise of management interfaces of the cyber security vault.

2. The method of claim 1 wherein the data to be backed up comprises files each consisting of a stream of segments, and wherein each segment is uniquely identified by a key label pair referred to as a fingerprint.

3. The method of claim 2 wherein each file is stored in a Merkle tree structure with content data stored in a bottom level of the tree and indexed by the fingerprints.

4. The method of claim 3 wherein an index lookup to read data returns a container ID and a region ID for a corresponding fingerprint.

5. The method of claim 4 wherein the corrupted data element comprises a missing fingerprint caused by a failed index lookup.

6. The method of claim 5 wherein the failed index lookup is caused by a failure of two or more disks in the disk array.

7. The method of claim 5 wherein the step of providing a missing data element for the corrupted data element comprises looking up bottom level (L0) references of a file Merkle tree in the cyber recovery vault, and if the segments are present in the vault, copying the segments back into a new container.

8. The method of claim 1 further comprising analyzing the retention locked copy of data to detect any malware causing data corruption in the data to be backed up.

9. The method of claim 8 further comprising reporting the result of the analyzing to a system administrator.

10. A method comprising:
striping a container holding compression regions of a file to be backed up across a plurality of disks in a disk array to first backup the file in primary storage;
providing a cyber security vault coupled to the primary storage;
configuring an air-gapped connection between the primary storage and the cyber security vault to be controlled from within the cyber security vault and that renders the cyber security vault inaccessible without control of the air-gapped connection;
storing, through a second backup, the compression regions in the cyber security vault;
making a point-in-time (PIT) copy of the compression regions in a namespace of the cyber security vault, and applying a retention lock to the PIT copy;
detecting a failed index lookup resulting in a missing segment for an access to data in a compression region of the container; and
providing, through the air-gapped connection, the missing segment from the PIT copy in the cyber security vault through the air-gapped connection, wherein the primary storage comprises part of a deduplication backup process executed by a data storage server running a Data Domain File System (DDFS), and further wherein the air-gapped connection is automated to provide network isolation and eliminate potential compromise of management interfaces of the cyber security vault.

11. The method of claim 10 wherein the file comprises of a stream of data segments, and wherein each data segment is uniquely identified by a key label pair referred to as a fingerprint.

12. The method of claim 11 wherein the file is stored in a Merkle tree structure with content data stored in a bottom level of the tree and indexed by the fingerprints, and wherein the index lookup to read data returns a container ID and a region ID for a corresponding fingerprint.

13. The method of claim 12 wherein the step of providing a missing segment comprises looking up bottom level (L0) references of a file Merkle tree in the cyber recovery vault, and if the segments are present in the vault, copying the segments back into a new container.

14. The method of claim 10 further comprising analyzing the retention locked copy of data to detect any malware causing data corruption in the data to be backed up, and reporting the result of the analyzing to a system administrator.

15. A system comprising:
a backup server copying data to be backed up from a production system to a backup system in a data center;
a cyber security vault coupled to the data center through an air gapped connection, wherein the air-gapped connection is configured to be controlled from within the cyber security vault to render the cyber security vault inaccessible without control of the air-gapped connection, and further wherein the backup server copies at least a portion of the data to be backed up to a first namespace in cyber security vault;
a copy component making a point-in-time (PIT) copy of the portion of data to a second namespace, and retention locking the copied portion of data in the second namespace; and an analysis component detecting a corrupted data element in the data to be backed up, and providing, through the air-gapped connection, a missing data element for the corrupted data element from the PIT copy in the cyber security vault, wherein the data center comprises part of a deduplication backup process executed by a data storage server running a Data Domain File System (DDFS), and further wherein the air-gapped connection is automated to provide network isolation and eliminate potential compromise of management interfaces of the cyber security vault, and yet further wherein the data to be backed up comprises compressed data stored in a container striped across of a plurality of disks in a disk array of the backup system, the data to be backed up comprising files each consisting of a stream of segments, and wherein each segment is uniquely identified by a key label pair referred to as a fingerprint.

16. The system of claim 15 wherein each file is stored in a Merkle tree structure with content data stored in a bottom level of the tree and indexed by the fingerprints, and wherein an index lookup to read data returns a container ID and a region ID for a corresponding fingerprint, and further wherein the corrupted data element comprises a missing fingerprint caused by a failed index lookup, and yet further wherein providing a missing data element for the corrupted data element comprises looking up bottom level (L0) references of a file Merkle tree in the cyber recovery vault, and if the segments are present in the vault, copying the segments back into a new container.

17. The system of claim 15 wherein the analysis component further analyzes the retention locked copy of data to detect any malware causing data corruption in the data to be backed up and reports the result of the analyzing to a system administrator.

* * * * *